Aug. 15, 1939  G. JACOBS  2,169,420
WIRE-BENDING MACHINE
Filed Nov. 27, 1936  2 Sheets-Sheet 1
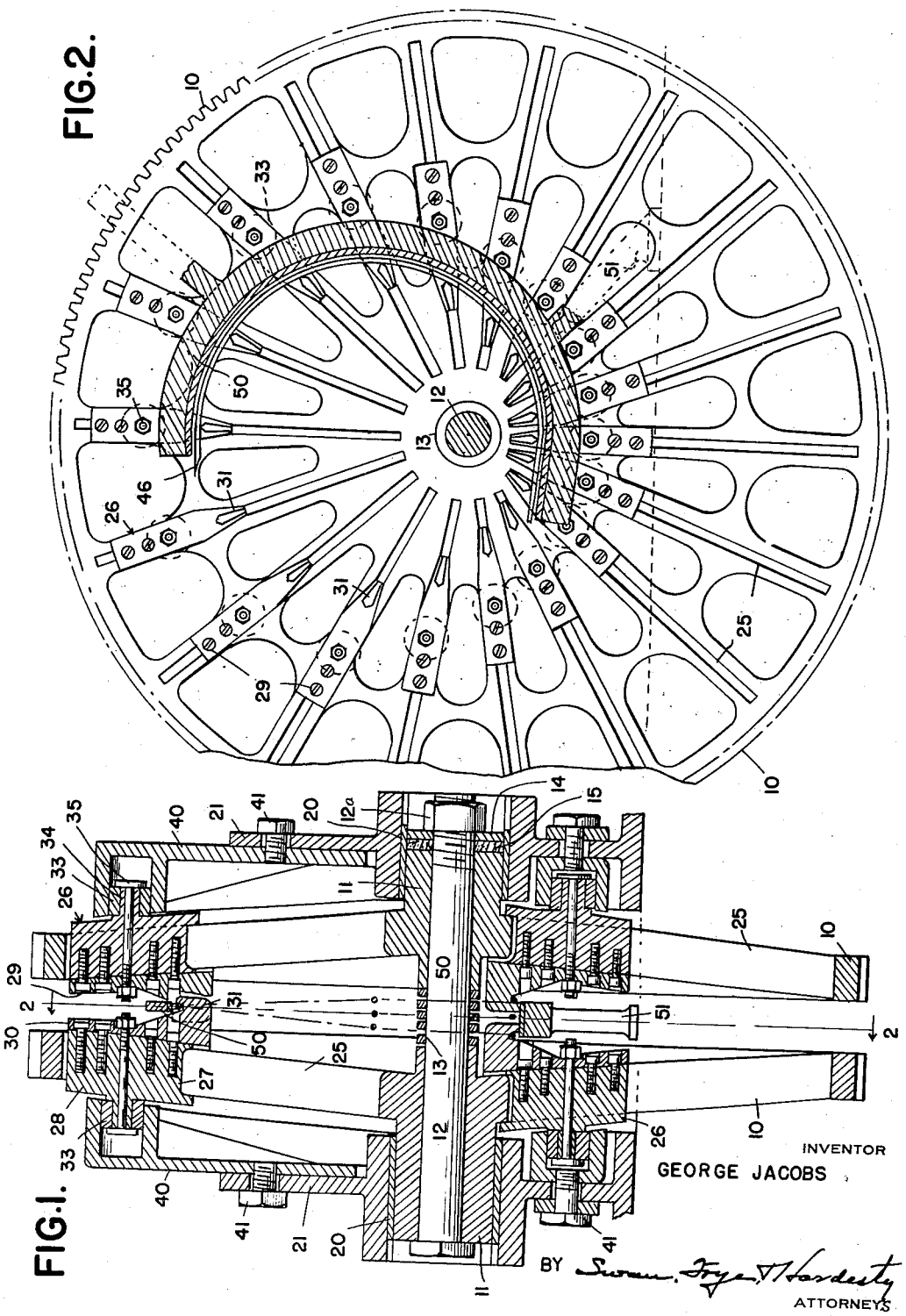
INVENTOR
GEORGE JACOBS Aug. 15, 1939.　　　　　G. JACOBS　　　　　2,169,420
WIRE-BENDING MACHINE
Filed Nov. 27, 1936　　　　　2 Sheets-Sheet 2
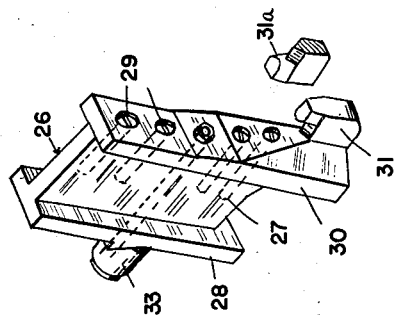
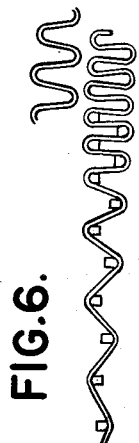
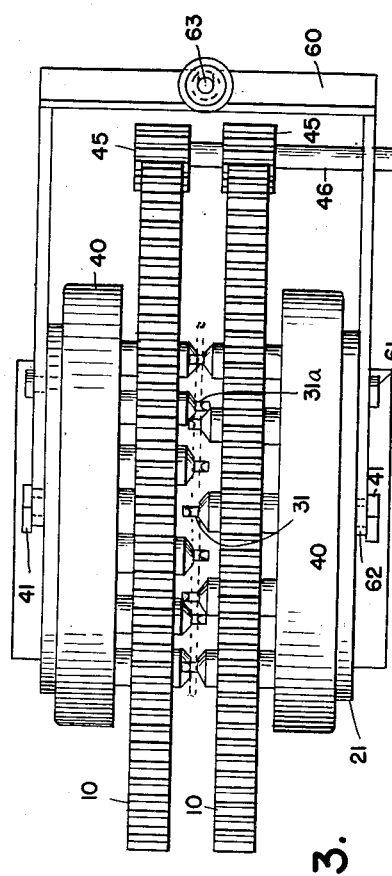
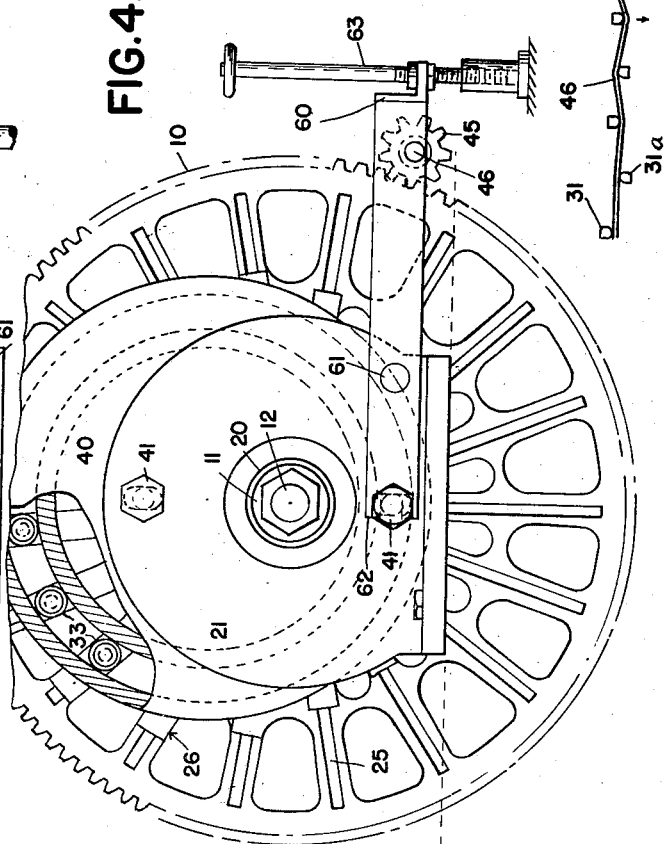
INVENTOR
GEORGE JACOBS
BY
ATTORNEYS Patented Aug. 15, 1939

2,169,420

UNITED STATES PATENT OFFICE 2,169,420

WIRE-BENDING MACHINE

George Jacobs, Detroit, Mich., assignor of one-half to Emil Goetz, Detroit, Mich.

Application November 27, 1936, Serial No. 112,921

6 Claims. (Cl. 140—91)

The present invention relates to machines for bending wire and more specifically for bending such wire into serpentine or zigzag form for the production of springs useful for various purposes.

Among the objects of the invention is a machine for the purpose indicated, which shall be continuous in operation and which may be operated to produce the bent wire in indeterminate lengths, to be subsequently cut to the lengths required.

Another object is a machine which shall be simple in construction and operation and little subject to wear or disablement.

Another object is a machine which may be readily adjusted to provide for a range of wire diameters, so as to enable the production of springs of differing resiliencies and different "pitch".

Still other objects will readily occur to those skilled in the art upon reference to the following description and drawings in which Figure 1 is a vertical central sectional view of a machine coming under the present invention, Figure 2 is a section on the line 2—2 of Figure 1, Figure 3 is a top plan view of the machine, Figure 4 is a side elevation, partly in section, Figure 5 is a detail in perspective, and Figure 6 is a diagrammatic view showing a wire in the process of being bent and also illustrating a portion of the product.

As indicated, the machine comprises a pair of gears 10 suitably dished and having on their convex sides large hubs 11. These gears 10 are, as shown, coupled together with their concave faces opposed, by means of a large bolt or shaft 12, a heavy spring 13 being interposed. Under the nut 12a on shaft 12 may be placed a metal washer or plate 14 and resilient washer or plate of rubber 15.

The gears 10 will have their hubs 11 suitably finished to provide bearing members for the pair and will be mounted in bearings 20 formed in end plates or frame members 21 secured to a suitable support (not shown).

The gears 10 are identical, and each is provided with radially arranged slots 25 cut through its web or spokes and extending from near the hub to near the rim, as shown in Figures 1 and 2; and in each slot is arranged a slide 26 such as is shown more in detail in Figures 1 and 5.

The slide 26 consists of a portion, T-shaped in cross-section, of which the stem 27 passes through a slot 25, with the cross piece 28 bearing against the outer face of a spoke. Secured to the part 27, as by suitable screws 29, is a plate 30 adapted to bear against the inner surface of a spoke, and this also is provided with a portion carrying a hook or finger 31 (those hooks carried by one gear being designated by the numeral 31, while those carried by the other gear being designated 31a).

In assembling the machine the wheels 10 will be so related to each other as to place the series of hooks 31 staggered with the series of hooks 31a, that is, each hook 31 will be evenly interspaced with adjacent hooks 31a.

The slide member 26 also carries a roller cam follower 33 on the side opposite hook 31, the roller being preferably mounted upon a hollow shaft portion 34, forming an integral part of the T-member, and held against longitudinal movement by a large headed bolt 35.

The cam followers 33 are intended to cooperate with a pair of face cams 40, each mounted eccentrically upon one of the frame members 21 by means of the screws 41, and so arranged as to cause the slides 26 to move radially in the slots 25 as the gears 10 are rotated. The rotation may be accomplished by small driving gears 45 carried by a shaft 46 driven by a suitable motor (not shown).

The operation of the machine seems quite obvious from the description and involves feeding a wire 46 between the hooks 31 and 31a at the top of the machine where the hooks 31 and 31a have moved toward each other to a position such as is indicated best in Figure 1 and at the left of Figure 6.

As the gears 10 revolve, the hooks begin to withdraw and, of course, pull the wire with them, gradually bending it to serpentine form, as shown in Figure 6, until they reach the bottom, at which point the two series of slides are farthest apart but the members of a series close together as indicated in Figs. 2 and 6.

When the slides again start outwardly of the slots 25, the wire is released and may be easily removed from the hooks.

In order to prevent the wire from becoming prematurely disengaged from the hooks, it is preferred to position a guide member 50 just outside of the path of the hooks so that it extends from the point of wire feed to just beyond the bottom point, as shown in Figure 2. The guide member may be supported in any suitable fashion, as by a leg 51, and is shown as narrow at the top and wide near the point of discharge.

The spring 13 and resilient member 15, respectively, are preferably provided to give a possible yield in the machine against excessive pull of hooks 31 and 31a and to act as a shock absorber in case of breakage of the wire. Of course, the spring 13 should be of sufficient strength to maintain the wheel spacing under usual operating conditions.

As mentioned above, it may be necessary or desirable to bend wire of different sizes upon the machine or to vary the "pitch", i. e., the distance from apex to apex of the zigzag bend, and therefore to cause the slides to move somewhat nearer to or farther from the center of the machine in order to make a proper bend. This is accomplished by providing means for lifting or lowering slightly the cams 40 from the position shown. Such means is shown in Figures 3 and 4 and through the use of vertically slotted holes in members 21 for the passage of screws 41.

The moving means consists of a yoke 60 of which the arms are fulcrumed at 61 on the frame members 21 and are forked at the end as at 62 to embrace corresponding screws 41. The outer end of the yoke is then provided with a suitable jack screw 63, by means of which the forked arms may be moved to move the cams 40 either up or down, when the screws 41 have been loosened.

What I claim is:

1. A wire bending machine comprising a pair of dished wheels carried upon a shaft and spaced from each other, with their convex sides outward, said wheels being provided with an equal number of radial slots in each, the slots of one wheel being staggered with respect to the slots of the other, slide members carried in said slots and provided with wire engaging means, means for rotating said wheels, and means for causing radial movement of said slide members in said slots during said rotation.

2. A wire bending machine comprising a pair of dished wheels carried upon a shaft and spaced from each other, with their convex sides outward, said wheels being provided with an equal number of radial slots in each, the slots of one wheel being staggered with respect to the slots of the other, slide members carried in said slots and provided with wire engaging means, a cam follower carried by each of said members, stationary cam means co-acting with said followers to cause radial movement of said members when said wheels are rotated, and means for rotating said wheels.

3. A wire bending machine comprising a pair of dished wheels carried upon a shaft and spaced from each other, with their convex sides outward, a pair of frame members having bearings in which said wheels are rotatably mounted, wire engaging members carried by said wheels and movable radially from near said shaft to near the periphery thereof, face cams carried by said frame members and co-acting with said members to provide such radial movement when the wheels are rotated, and means for producing such rotation.

4. A wire bending machine comprising a pair of dished wheels carried upon a shaft and spaced from each other, with their convex sides outward, a pair of frame members having bearings in which said wheels are rotatably mounted, wire engaging members carried by said wheels and movable radially from near said shaft to near the periphery thereof, face cams adjustably carried by said frame members and co-acting with said members to provide such radial movement when the wheels are rotated, means for producing such rotation, and means for simultaneously and equally adjusting the position of said cams.

5. In a wire bending machine a pair of opposed series of wire engaging members, the members of one series being evenly interspaced between the members of the other series, means for moving the members of one series to and from overlapping relation with the members of the other series, and means for causing the members of a series to approach and recede from each other.

6. In a wire bending machine a pair of opposed series of wire engaging members, the members of one series being evenly interspaced between the members of the other series, means for moving the members of one series to and from overlapping relation with the members of the other series, means for causing the members of a series to approach and recede from each other, and means for maintaining the engagement of a wire with said members.

GEORGE JACOBS.